(12) United States Patent
Wingen (10) Patent No.: US 7,104,598 B2
(45) Date of Patent: Sep. 12, 2006

(54) OPENABLE MOTOR VEHICLE ROOF

(75) Inventor: Bernhard Wingen, Feldkirchen (DE)

(73) Assignee: Wabasto AG, Stockforf (DE)

( * ) Notice: Subject to any disclaimer, the term of this patent is extended or adjusted under 35 U.S.C. 154(b) by 0 days.

(21) Appl. No.: 10/896,952

(22) Filed: Jul. 23, 2004

(65) Prior Publication Data

US 2005/0017547 A1    Jan. 27, 2005

(30) Foreign Application Priority Data

Jul. 24, 2003    (DE) .............................. 103 33 781

(51) Int. Cl.
*B60J 7/047* (2006.01)
(52) U.S. Cl. ................................. 296/216.03
(58) Field of Classification Search ............ 296/216.03
See application file for complete search history.

(56) References Cited

U.S. PATENT DOCUMENTS

| | | | |
|---|---|---|---|
| 4,923,246 A | | 5/1990 | Takahashi et al. |
| 5,288,125 A | * | 2/1994 | Huyer .................... 296/216.03 |
| 5,527,085 A | | 6/1996 | Ochiai et al. |
| 6,494,529 B1 | | 12/2002 | Manders |
| 6,550,853 B1 | | 4/2003 | Wingen et al. |
| 6,568,750 B1 | * | 5/2003 | Radmanic et al. ...... 296/216.03 |
| 6,619,732 B1 | * | 9/2003 | Radmanic ............... 296/216.03 |
| 6,695,398 B1 | * | 2/2004 | Racine et al. ........... 296/216.03 |
| 2002/0093226 A1 | | 7/2002 | Schleicher et al. |
| 2002/0113467 A1 | * | 8/2002 | Radmanic ............... 296/216.03 |
| 2003/0075956 A1 | | 4/2003 | Tamura et al. |

FOREIGN PATENT DOCUMENTS

DE    100 46 068    *    4/2002

* cited by examiner

*Primary Examiner*—Dennis H. Pedder
(74) *Attorney, Agent, or Firm*—David S. Safran (57) ABSTRACT

Openable motor vehicle spoiler roof, with at least one cover carrier for a cover which can be raised at its rear edge by pivoting the cover and in the raised state can be displaced to the rear in the lengthwise direction of the roof. The cover carrier is movably guided in the lengthwise direction of the roof by means of a first and second slide elements and is provided with a guide path with which a control carriage, which is also movably guided along the roof-mounted guide in the lengthwise direction of the roof, is engaged. The second slide element is connected to the cover carrier via a coupling element which is coupled to the cover carrier. At least during the pivoting movements of the cover, the second slide element can be moved over the coupling element depending on the motion of the control carriage.

15 Claims, 6 Drawing Sheets

Fig. 6

OPENABLE MOTOR VEHICLE ROOF

BACKGROUND OF THE INVENTION

1. Field of the Invention

The invention relates to an openable motor vehicle roof which is made as a spoiler roof, with at least one cover carrier for a cover which can be raised at its rear edge by means of a raising and displacement mechanism out of a closed position, in which it closes the roof opening, by pivoting the cover, and to clear the roof opening in the raised state, it can be displaced to the rear in the lengthwise direction of the roof, the cover carrier being movably guided along a roof-mounted guide in the lengthwise direction of the roof by means of a first slide element and a second slide element which are located at a distance from one another in the lengthwise direction of the roof and being provided with a guide path along which a control carriage is engaged, the control carriage being movably guided along the roof-mounted guide in the lengthwise direction of the roof.

2. Description of Related Art

A motor vehicle roof of the initially mentioned type is known from published German Patent Application DE 100 55 790 A1 and corresponding U.S. Pat. No. 6,550,853. Here, the first slide element is a guide shoe which is pivotally supported on the front end of the cover carrier, while the second slide element is a guide shoe which is permanently connected to the cover carrier. In the known structure of the raising and displacement mechanism for the cover, it is difficult to accurately control the front edge of the cover in the course of the opening and closing movements such that, in the closed position of the cover, perfect sealing is ensured in the area of the edge gap between the front edge of the cover and the front edge of the roof opening, without undesirably high contact forces being necessary, and without squeezing or any other excess stressing of the seal arrangement provided for this edge gap area when the cover leaves the closed position or travels into the closed position.

SUMMARY OF THE INVENTION

A primary object of this invention is to devise an openable motor vehicle roof which is made as a spoiler roof and which allows improved control of the motion of the front edge of the cover, especially in the critical phases in which the cover leaves the closed position or travels into the closed position, using relatively simple means.

This object is achieved in accordance with the invention in that a motor vehicle roof of the initially mentioned type has the second slide element connected to the cover carrier via a coupling element which is coupled to the cover carrier, and that, at least during the pivoting movements of the cover, the second slide element can be moved over the coupling element depending on the motion of the control carriage.

Because, in accordance with the invention, the second slide element is connected to the cover carrier, not rigidly, but via a coupling element, onto which forced motion is impressed during the pivoting movements of the cover, the path along which the front edge of the cover moves can be easily adjusted in a manner that is especially favorable for the respective roof construction including the sealing arrangement used, in order to meet the above described requirements.

Thus, the coupling element is dynamically connected to the control carriage, preferably via a coulisse arrangement. By the corresponding choice of the guide path of this coulisse arrangement, the behavior of the curve described by the path of the front edge of the cover can be especially flexibly matched to the respective structural circumstances of the motor vehicle roof.

The coupling point of the coupling element to the cover carrier and the second slide element are preferably arranged on the opposing lengthwise ends of the coupling element. Advantageously, the coulisse arrangement has a guide path which runs in the lengthwise direction of the coupling element and a slider which interacts with this guide path and which is permanently connected to the control carriage, and the slider which forms one part of the coulisse arrangement can, at the same time, be part of an arrangement via which the control carriage engages the guide path of the cover carrier.

The raising and displacement mechanism can be designed, for example, according to a preferred embodiment, such that the front edge of the cover executes essentially a pure displacement motion laterally in the immediate vicinity of the cover closed position. In doing so, it is also possible to provide for the motion of the front edge of the cover to run obliquely up and to the rear even in the immediate vicinity of the cover closed position in the course of the opening process in the middle of the roof because, due to the curvature of the roof, the middle of the cover is higher. The structure of the raising and displacement mechanism of the invention in this relation, however, offers diverse possible variations.

During raising movements of the cover, the second slide element, under the influence of the adjustment motions of the coupling element and optionally the adjustment motions of the first slide element along the roof-mounted guideway, is preferably adjusted such that limited cover displacement motion is superimposed on the raising motion of the cover.

The cover, in the raised state, can preferably be locked to the control carriage via the coupling element for displacement motions in the lengthwise direction of the roof. In doing so, the guide path of the coulisse arrangement which connects the coupling element to the control carriage advantageously has a segment of the path which, in the locked state, prevents the slider of this coulisse arrangement from moving in the lengthwise direction of the roof, while the roof-mounted guide is provided with an arrangement which interacts with the second slide element in order to keep the slider in the locked state during the displacement motions of the raised cover.

The roof-mounted guide, in a known manner (see, U.S. Pat. No. 6,550,853) can have a path segment which rises obliquely to the rear and which the first slide element traverses in the course of pivoting movements of the cover.

For especially stable support of the cover, the roof-mounted guide is advantageously provided with a guide rail with an essentially U-shaped cross section and the control carriage is movably guided along control carriage guideways which are spaced opposite one another.

The guide path of the cover carrier can be formed especially by a T-guide.

An embodiment of the invention is explained in detail below with reference to the accompanying drawings.

DETAILED DESCRIPTION OF THE INVENTION

Figure 1:
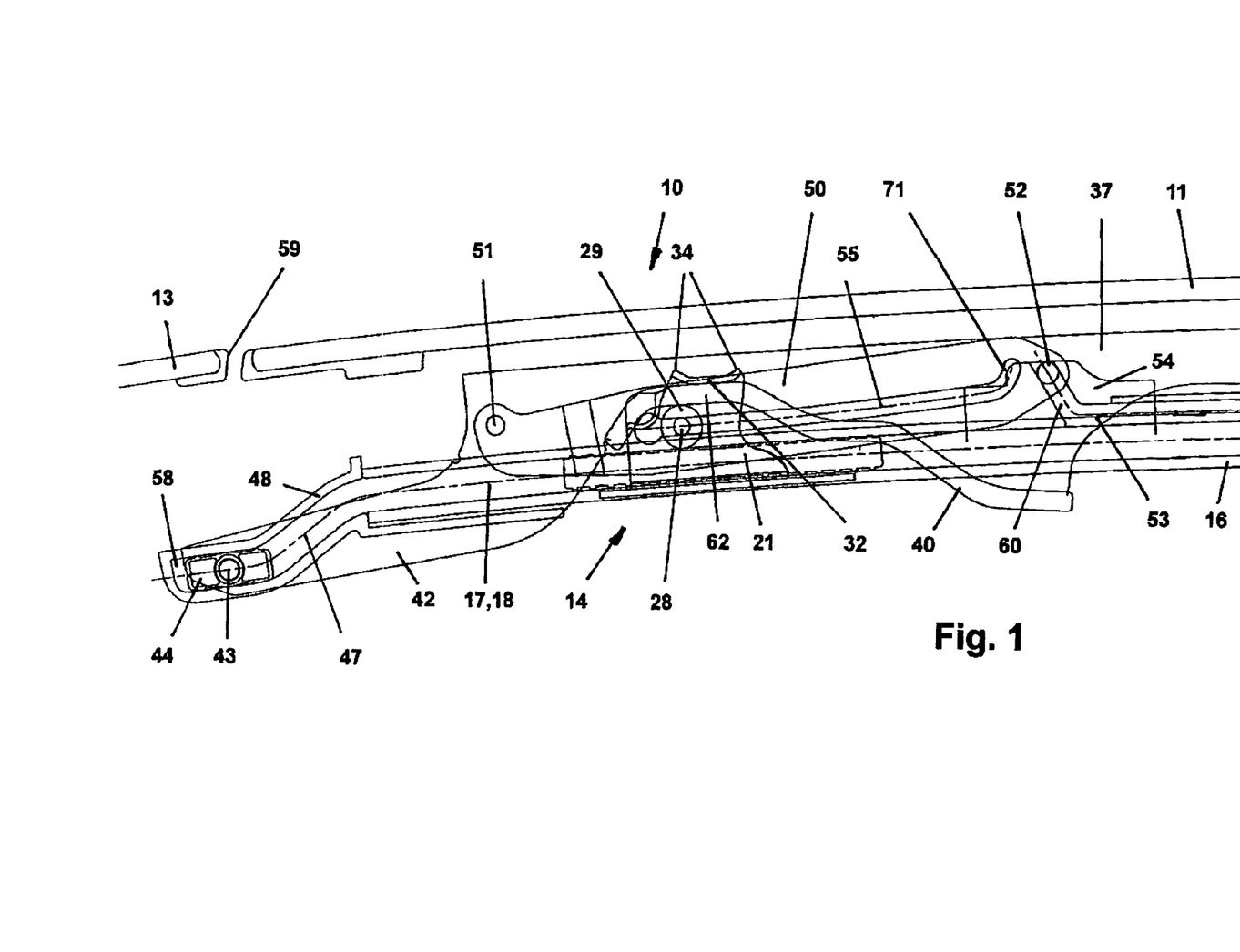
FIG. 1 schematically shows a partial lengthwise section of a motor vehicle roof with the cover in the closed position.

FIG. 1 shows a vehicle spoiler roof 10 which has a cover 11 for selectively closing or clearing a roof opening 12 which is made in a fixed roof skin 13. The mechanism which is necessary for raising and moving the cover 11 has the same structure on either side of the cover 11. Therefore, only the mechanism which is assigned to one side of the cover is explained below using the drawings.

Figure 6:
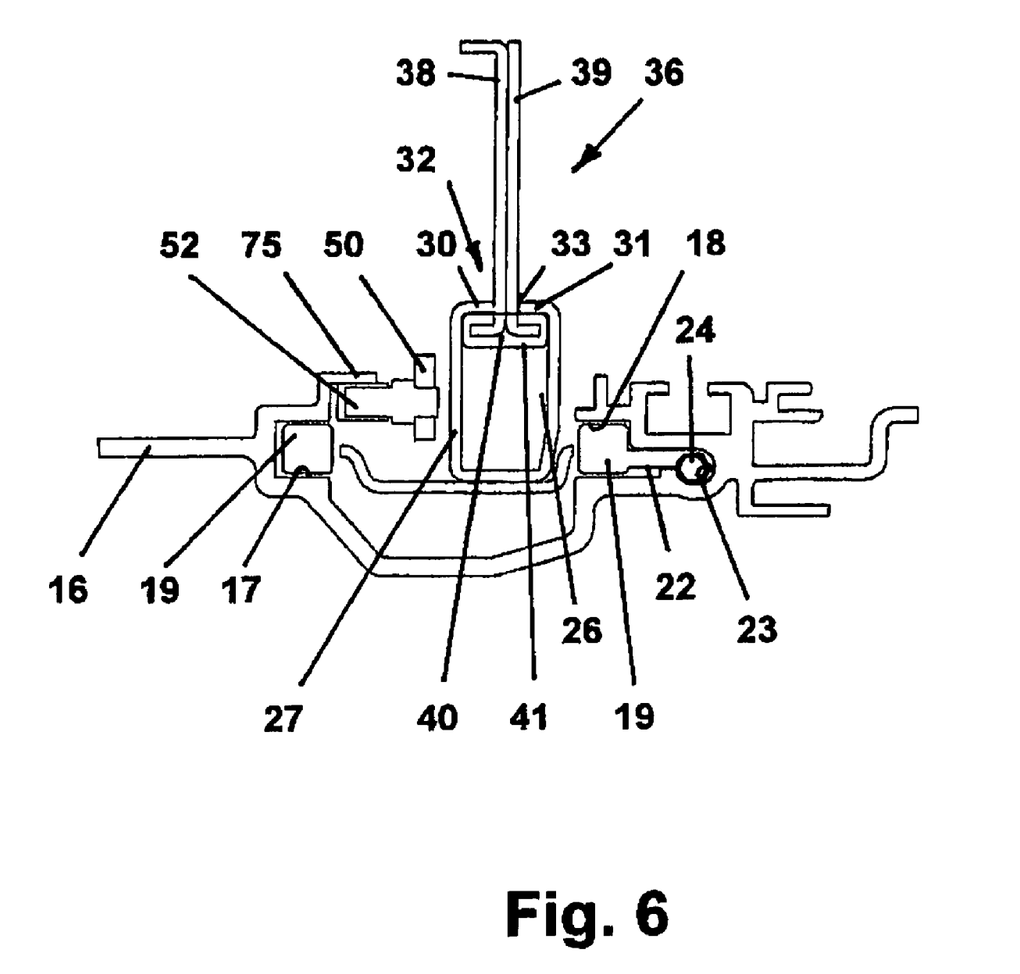
FIG. 6 shows a schematic cross section of the raising and displacement mechanism as shown in FIGS. 1 to 5.

The illustrated raising and displacement mechanism 14 for the cover 11 includes a guide 15, which is fixed on the roof skin 13, with a guide rail 16 which is made as a profile part with guideways which run in the displacement direction of the cover which agrees with the lengthwise direction of the vehicle. In two of these guideways 17, 18 (FIG. 6) which are spaced opposite one another and which are open on their facing sides, the sliding blocks 19 of a control carriage 21 are guided to be able to move in the lengthwise direction of the roof. The control carriage 21 is permanently connected via a coupling element 22 to a drive cable 24 which is guided to be able to move lengthwise in a further guideway 23 of the guide rail 16. The drive cable 24 can be, for example, a compressively stiff threaded cable which engages the driving pinion of a drive motor (not shown).

The control carriage 21 has a hollow carriage body 26. A bearing pin 28 which is permanently connected to the lengthwise side walls 27 of the carriage body 26 extends transversely through the hollow carriage body 26. A contact roller 29 is supported to rotate on a bearing pin 28 in the carriage body 26. The top of the carriage body 26 has wall sections 30, 31 which adjoin the lengthwise side walls 27 at the top and which form a guide section 32 of the control carriage 21. The facing free lengthwise edges of the wall sections 30, 31 border a lengthwise slot 33 and the wall sections 30, 31 are bent up obliquely to the front and back, as can be seen, for example, in FIG. 1 at 34.

The control carriage 21 according to FIGS. 1 to 5 interacts with a T-guide 36 (shown in FIG. 6) which is in the form of an inverted T-shaped guide section of a cover carrier 37 which extends under the cover 11 in the lengthwise direction of the vehicle and which is permanently connected, for example, screwed, to the pertinent side of the cover. On the other side of the cover, is a corresponding cover carrier. The T-guide 36 which, in the illustrated embodiment, has two essentially vertical sheet metal parts 38, 39 which are superficially connected to one another with bottom ends being bent in the direction which faces away from one another and being extrusion-coated with a highly slippery (low friction) plastic to form a guide path 40. The guide section 32 of the carriage body 26 is slidingly engaged with the top of the guide path 40, while the contact roller 29 rests against the bottom of the guide path 40. Bending up the ends 34 of the wall sections 30, 31 prevents interlocking of the guide path 40 and the carriage body 26.

Furthermore, the cover carrier 37 has a projection 42 which lies at a distance from the bottom of the cover, which projects forward and which carries a guide shoe 44. The guide shoe 44 is supported to be able to pivot around the cover pivoting axis 43 which runs essentially horizontally. The axis 43 is located at a distance from the bottom of the cover 11 and is at least roughly aligned in the lengthwise direction of the vehicle with its front edge 45. The guide shoe 44 is able to move lengthwise depending on the cover position in at least one of the guideways 17, 18 of the guide rail 16 or in a guideway 47 which adjoins the front end of the guideways 17 and/or 18 and which is made in an extension piece 48 which forms part of the roof-mounted guide 15 and which is permanently connected to the guide rail 16.

By means of the cover carrier 37, the front area of the cover 11 is supported at two points which are spaced apart from one another in the direction of cover displacement relative to the roof-mounted guide (guide rail 16 and extension piece 48), on the one hand, directly over the front guide shoe 44, and on the other, indirectly over the control carriage 21.

A locking lever 50 which extends in the cover displacement direction is supported at its front end to pivot in an essentially vertical plane on the cover carrier 37 via a bearing journal 51. The bearing journal 51 sits in the cover displacement direction between the cover pivot axis 43 and the front end of the guide section 36. The rear end of the locking lever 50, in the cover displacement direction, lies near the back end of the guide section 36 and bears a slider 52 which is guided in a roof-mounted guide path 53 when the cover is in the area of its front end position. The guide path 53, in the illustrated embodiment, is made in a guide block 54 which is fixed with respect to the guide rail 16. The locking lever 50, for its part, is provided with an elongated guide slot 55 into which the bearing pin 28, which is permanently connected to the control carriage 21, fits in the manner of a guide slider in order to control the pivoting motion of the locking lever 50 relative to the cover carrier 37.

FIG. 1 shows the raising and displacement mechanism 14 with the cover 11 in the closed position. The guide shoe 44, guided in the transverse and vertical direction, is located in an essentially horizontally running segment 58 of the guideway 47 which is determined by the extension piece 48. Here, it is located at least roughly underneath the front edge 59 of the roof opening 12. The bearing pin 28 is located near the front end of the guide path 55 of the locking lever 50 and keeps the locking lever 50 in the position in which the slider 52, which is located on the back end of the locking lever 50, is on the top end of a section 60 of the roof-mounted guide path 53, which section is inclined steeply upward and forward. The guide section 32 and the contact roller 29 engage a front elevated and essentially horizontally running section 62 of the guide path 40, by which the cover 11 is pulled down.

Figure 2:
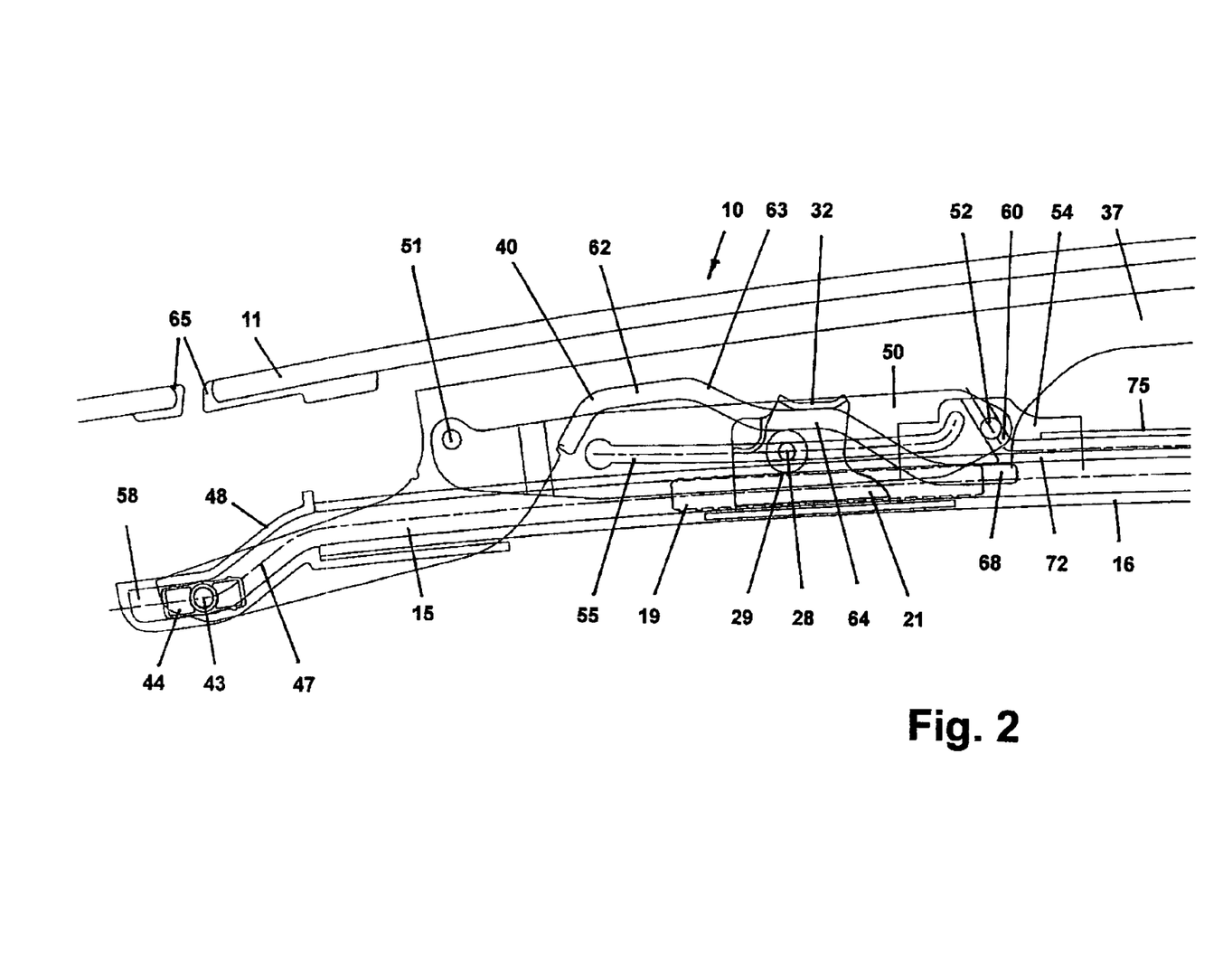
FIGS. 2 to 4 show partial lengthwise sections according to FIG. 1 which illustrate the raising of the cover.

In order to raise the rear edge of the cover 11 over the roof skin 13, the raising and displacement mechanism 14 is moved into the position illustrated in FIG. 2. The control carriage 21 is pushed to the rear via the drive cable 24 along the guide rail 16. The guide section 32 and the contact roller 29 move along a section 63 of the guide path 40, which section declines obliquely to the rear, to an again essentially horizontal section 64 of the guide path 40, by which the cover carrier 37, and thus the cover 11, are pressed up. During this motion of the cover carrier 37, by the interaction of the bearing pin 28 with the guide path 55 which declines obliquely to the rear, the locking lever 50 is pivoted clockwise in FIGS. 1 and 2 around the bearing journal 51. In this way, the slider 52 is shifted a short distance down in the steep path section 60 of the roof-mounted guide block 54, so that the cover 11 is shifted to the rear by a small amount which is just enough to prevent squeezing of the seal arrangement 65 in the area of the front edge 59 of the roof opening. The cover 11, in the transition from its closed position as shown in FIG. 1 into the raised position as shown in FIG. 2, executes essentially a pivoting motion around the cover pivot axis 43 which is located in the segment 58 of the guideway 47.

Figure 3:
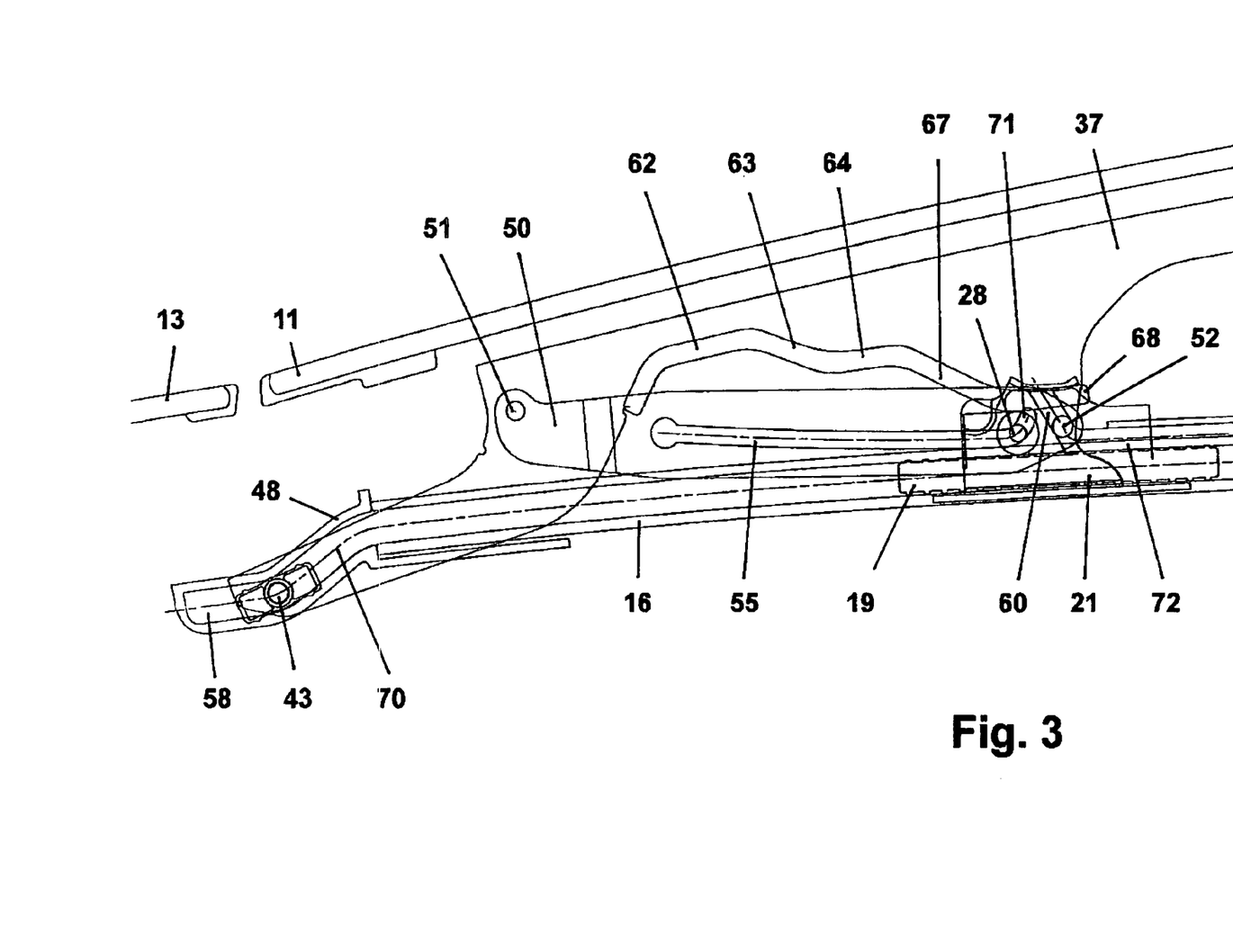

As the control carriage 21 is moved further to the rear, according to FIG. 3, the guide section 32 and the contact roller 29 are moved along a section 67 of the guide path 40, which section declines obliquely to the rear, to a section 68 of the guide path 40 which runs essentially parallel to the path section 64. The cover carrier 37 is raised further. The bearing pin 28 which is connected to the control carriage 21 reaches the lower end of a section 71 of the guide path 55 of the locking lever 50, which section rises steeply to the rear. In doing so, the locking lever 50 is raised somewhat in the area of the bearing pin 28, while at the same time, the bearing journal 51 is also moved upwards. In this way, the slider 52 is moved into the position near the lower end of the path section 60 of the guide block 54; this allows only a slight further displacement of the cover 11 to the rear into a position in which the cover pivoting axis 43 reaches the transition from the path section 58 to a section 70 of the guideway 47, which section rises obliquely to the rear. The cover 11 is raised further at its rear edge.

Figure 4:
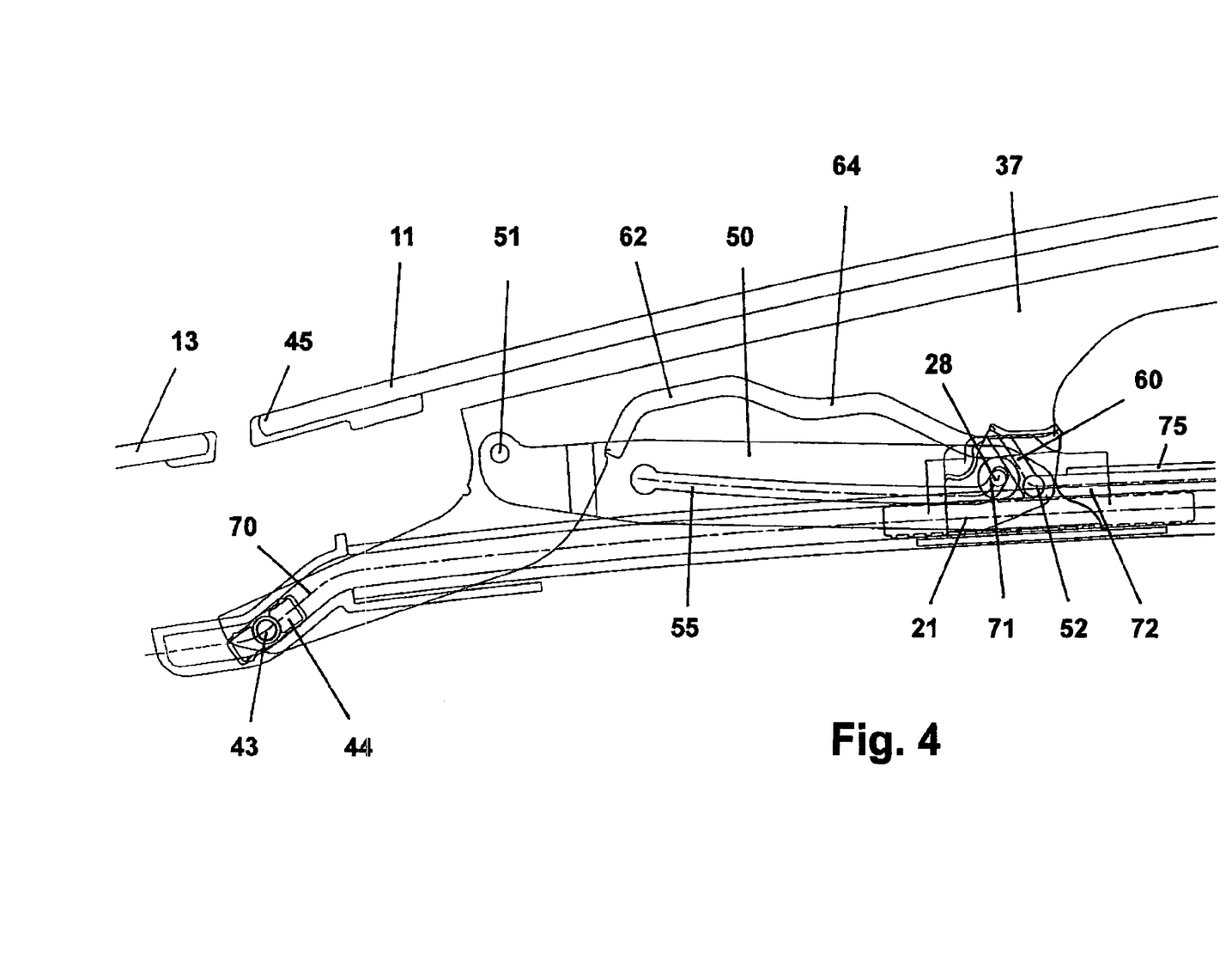

FIG. 4 shows the raising and displacement mechanism 15 in the position in which—shortly after traversing the position according to FIG. 3—the cover pivoting axis 43 has passed into the section 70 of the guideway 47. By running up the guide shoe 40 along the path section 70, the front edge of the cover is raised. In the position as shown in FIG. 4, the bearing pin 28 is inserted into the steep section 71 of the guide path 55 which is made in the locking lever 50. Thus, the locking lever 50 locks the control carriage 21 to the cover carrier 37 for movements in the cover displacement direction. The slider 52 is now disengaged from the section 60 of the guide path 53 of the guide block 54 for an displacement motion to the rear in the section 72 of the guide path 53, which section runs in the cover displacement direction and which prevents it from yielding upwardly, and following it to the rear by the crosspiece 75 of the guide rail 16, which crosspiece is open to the bottom. In this way, the locking lever 50 is kept in the locked position in which the bearing pin 28 engages the section 71 of the guide path 55.

Figure 5:
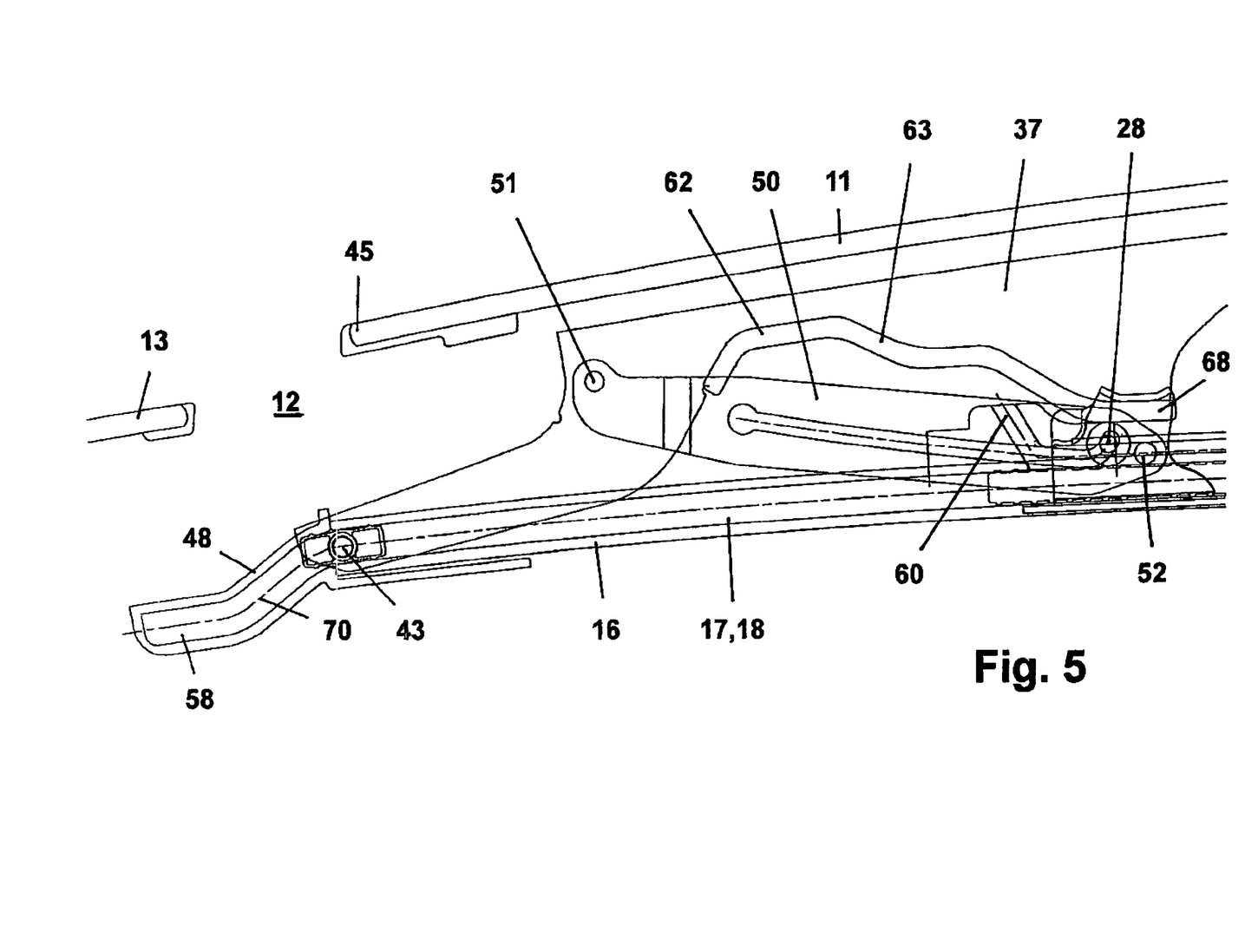
FIG. 5 shows a partial lengthwise section according to FIG. 1 which represents the motor vehicle roof with the cover fully raised and already pushed back roughly in the opening direction.

If the control carriage 21 is pushed farther to the rear via the drive cable 24 as shown in FIG. 5, the cover pivot axis 43 is moved up in the path section 70, and the guide shoe 44 then enters the guideway(s) 17 and/or 18 of the guide rail 16. The cover is entrained via the locking lever 50 and the cover carrier in the direction of opening (i.e., to the rear in FIG. 5) and its front edge 45 is shifted further up according to the raising of the cover pivoting axis 43. Compared to FIG. 1, the distance between the cover pivoting axis 43 and the support of the cover 11 has been increased via the control carriage 21 by roughly the length of the guide path 55; this contributes to the stability of the spoiler roof.

If, proceeding from the open position of the spoiler roof 10, the control carriage 21 is moved in the cover closing direction,—by the interaction of the slider 52 with the crosspiece 75 and the section 72 of the guide path 53—the control carriage 21 remains locked to the cover 11 until the slider 52 reaches the lower end of the path section 60. By raising the slider 52 in the path section 60, then the illustrated locking is released. The control carriage 21 can then move again in the cover displacement direction relative to the cover 11. The cover 11 can be pivoted by moving the control carriage 21 into the closed position, as shown in FIG. 1.

Within the framework of the invention, numerous modifications go without saying. Among others, the motor vehicle roof can be provided with several roof elements, for example, covers, which can be adjustable or stationary. In particular, the explained structure is also suited for double- and multi-spoiler roofs. The described cover carrier with a T-guide offers high stability connected with an especially low structural height. However, instead, there can also fundamentally be a cover carrier which, in the conventional manner, is equipped with a guide slot which more or less corresponds to the path of the T-guide. Because in this embodiment the guideway 47 and the guide path 53 are made in the extension components of the guide rail 16, specifically the extension piece 48 and the guide block 54, the guide rail 16 itself can be made as a simple profiled component. Basically however, the guideway 47 and/or the guide path 53 can also be provided in guide parts which are connected integrally to the guide rail.

What is claimed is:

1. Openable motor vehicle spoiler roof, comprising:
    a cover for selectively opening and closing a roof opening in a fixed vehicle roof;
    at least one cover carrier for said cover, the at least one cover carrier having a guide path projecting therefrom and having a first slide element and a second slide element which are located at a distance from one another in the lengthwise direction of the roof and are movably guided along a roof-mounted guide in the lengthwise direction of the roof;
    a raising and displacement mechanism for moving the cover out of a closed position in which the cover closes the roof opening into a raised state by pivoting the cover so as to raise the rear edge thereof and for moving the cover in the raised state to the rear in a lengthwise direction of the roof;
    a control carriage which is part of the raising and displacement mechanism and is movably guided along the roof-mounted guide in the lengthwise direction of the roof;
    wherein the guide path of the cover carrier is received within the control carriage in engagement therewith;
    wherein the second slide element is connected to the cover carrier via a coupling element which is coupled to the cover carrier, and wherein, at least during the pivoting movements of the cover, the second slide element is movable upward and downward with the coupling element depending on the motion of the control carriage.

2. Motor vehicle roof as claimed in claim 1, wherein the coupling element is dynamically connected to the control carriage via a coulisse assembly.

3. Motor vehicle roof as claimed in claim 1, wherein a coupling point of the coupling element to the cover carrier and the second slide element are arranged on opposite lengthwise ends of the coupling element.

4. Motor vehicle roof as claimed in claim 2, wherein the coulisse assembly has a guide path which runs in the lengthwise direction of the coupling element and a slider which interacts with the guide path of the coulisse assembly and which is permanently connected to the control carriage.

5. Motor vehicle roof as claimed in claim 4, wherein said slider is also part of an arrangement via which the control carriage engages the guide path of the cover carrier.

6. Motor vehicle roof as claimed in claim 1, wherein the raising and displacement mechanism is adapted to cause a front edge of the cover to execute an essentially purely linear displacement motion in the immediate vicinity of the cover closed position.

7. Motor vehicle roof as claimed in claim 1, wherein, during raising movements of the cover, the second slide element is displaced in a maimer superimposing limited cover longitudinal displacement motion on the raising motion of the cover under the influence of movement of the coupling element.

8. Motor vehicle roof as claimed in claim 7, wherein the displacement of the second slide element during raising movement of the cover is also produced in part by the displacement of the first slide element along the roof-mounted guideway.

9. Motor vehicle roof as claimed in claim 1, wherein the cover, in the raised state, is lockable to the control carriage via the coupling element for displacement in the lengthwise direction of the roof.

10. Motor vehicle roof as claimed in claim 4,
wherein the cover, in the raised state, is locked to the control carriage, via the coupling element, for displacement in the lengthwise direction of the roof; wherein the coupling element, in a locked state, locks the control carriage to the cover carrier so that only longitudinal displacement of the raised cover is produced during further opening thereof.

11. Motor vehicle roof as claimed in claim 1, wherein the roof-mounted guide has a path segment which rises obliquely rearward and which the first slide element traverses during pivoting of the cover.

12. Motor vehicle roof as claimed in claim 1, wherein the roof-mounted guide has a guide rail with an essentially U-shaped cross section and the control carriage is movably guided along control carriage guideways which are spaced from and face opposite one another.

13. Motor vehicle roof as claimed in claim 1, wherein the guide path of the cover carrier has a guide that is T-shaped in cross section.

14. Motor vehicle roof as claimed in claim 1, wherein the first slide element is a guide shoe and the second slide element is a slider.

15. Motor vehicle roof as claimed in claim 1, wherein the coupling element is a locking lever which is passively raised by the control carriage during raising of the cover by the raising and displacement mechanism and only becomes active when the cover is in a fully raised position at which the locking lever locks the control carriage to the cover carrier.

* * * * *

UNITED STATES PATENT AND TRADEMARK OFFICE
CERTIFICATE OF CORRECTION

PATENT NO.         : 7,104,598 B2
APPLICATION NO. : 10/896952
DATED              : September 12, 2006
INVENTOR(S)        : Bernhard Wingen It is certified that error appears in the above-identified patent and that said Letters Patent is hereby corrected as shown below:

On the title page, item [73] should read
--Assignee: Webasto AG, Stockdorf (DE) --.

Signed and Sealed this

Fifth Day of December, 2006

JON W. DUDAS
*Director of the United States Patent and Trademark Office*